UNITED STATES PATENT OFFICE.

GEORGE WEINTRAUB, OF LYNN, MASSACHUSETTS, ASSIGNOR TO GENERAL ELECTRIC COMPANY, A CORPORATION OF NEW YORK.

PROCESS OF MAKING BORON NITRID.

1,135,232.  Specification of Letters Patent.  Patented Apr. 13, 1915.

No Drawing.  Application filed February 3, 1913. Serial No. 745,820.

*To all whom it may concern:*

Be it known that I, GEORGE WEINTRAUB, a citizen of the United States, residing at Lynn, in the county of Essex, State of Massachusetts, have invented certain new and useful Improvements in Processes of Making Boron Nitrid, of which the following is a specification.

Various processes for making nitrid of boron are described in the chemical literature. However, the percentage yield obtainable by these methods is not only poor but the nitrid thus produced is not chemically stable. For example, it is slowly decomposed by hot water, forming boric anhydrid and ammonia. It is also quite readily oxidizable even at relatively low temperatures. Its chemical instability may be due either to its physical state or to associated impurities. The instability of boron nitrid is more marked in the product of certain reactions than others, but to my best knowledge the above holds true of all boron nitrid heretofore produced.

I have discovered that when compounds of boron, such as boric anhydrid, borax, etc., are heated in the presence of a cyanogen compound, such as a cyanid or a ferrocyanid, at a temperature high enough to quickly volatilize all products of the reaction, other than boron nitrid, that a good yield of very pure, stable nitrid of boron is produced.

The reaction between boric acid and cyanids is not a new one. It has been used by Balmain and is described in text books. The reaction was carried out in an ordinary gas furnace and the products of the reaction, which are of various natures including carbonates and cyanates, had to be washed out with water and the product then dried. Due to the low temperature of the reaction the boron nitrid obtained is of a low degree of stability and during the washing and drying decomposed to a large degree, also the yield is not satisfactory.

I have discovered that if the reaction is carried out at a temperature at which the carbonates and cyanates as well as the excess of borax or boric anhydrid used are easily volatile, that all the substances with the exception of boron nitrid are volatilized so that no further treatment is necessary and that the boron nitrid obtained, due to the high temperature of the reaction, is of a high degree of stability.

In carrying out my invention, one part of boric anhydrid, borax, or other boron compound, and one to two parts of potassium or sodium cyanid, or a chemically equivalent amount of another cyanogen compound are finely powdered and mixed, as by tumbling in a ball mill. The mixture is placed in a graphite crucible or other refractory container and brought rapidly to a temperature of about 2000° C. in a furnace, which will allow the escape of fumes, such as an electric resistance furnace. Preferably the furnace is preheated to the reaction temperature. Copious vapors are evolved at once. The fumes, when using a cyanid, consist largely of the carbonate of the metallic constituent, for example, sodium carbonate, and are substantially free from cyanogen or cyanid, so that the operation is perfectly safe, even though no special provision is made to carry away the fumes. The reaction is allowed to continue until no more fumes are given off. This time may be as short as a few minutes, depending on the quantity used. About 30% and upward theoretical yield of white, stable boron nitrid is produced.

I make no claim herein on stable boron nitrid as an article of manufacture, this material being claimed in a copending application, Serial No. 745,819, filed concurrently herewith.

What I claim as new and desire to secure by Letters Patent of the United States, is:—

1. The process of making boron nitrid which consists in heating a mixture of boron-containing material and a cyanid to a temperature at which reaction occurs and the products other than boron nitrid are volatilized.

2. The process of making boron nitrid which consists in heating a mixture of boron compound and a cyanogen compound to a temperature at which reaction occurs and substantially all by-products are volatilized.

3. The process of making pure, stable boron nitrid which consists in heating a mixture of boric anhydrid and a cyanid to a temperature of about 2000° C. until no more fumes are evolved.

4. A process of making pure stable boron nitrid which consists in heating a mixture comprising about one part of boric anhydrid and about one to two parts of potassium cyanid rapidly up to a temperature of about 2000° C. until no fumes are given off under conditions allowing the free escape of the fumes.

In witness whereof, I have hereunto set my hand this thirty-first day of January, 1913.

GEORGE WEINTRAUB.

Witnesses:
JOHN A. MCMANUS, Jr.,
FRANK G. HATTIE.

Correction in Letters Patent No. 1,135,232.

It is hereby certified that in Letters Patent No. 1,135,232, granted April 13, 1915, upon the application of George Weintraub, of Lynn, Massachusetts, for an improvement in "Processes of Making Boron Nitrid," an error appears in the printed specification requiring correction as follows: Page 1, line 92, strike out the syllable "ron" before "containing"; and that the said Letters Patent should be read with this correction therein that the same may conform to the record of the case in the Patent Office.

Signed and sealed this 11th day of May, A. D., 1915.

[SEAL.]
R. F. WHITEHEAD,
*Acting Commissioner of Patents.*